A. KIPP.
MEASURING GLASS.
APPLICATION FILED JUNE 8, 1906.
925,582.
Patented June 22, 1909.
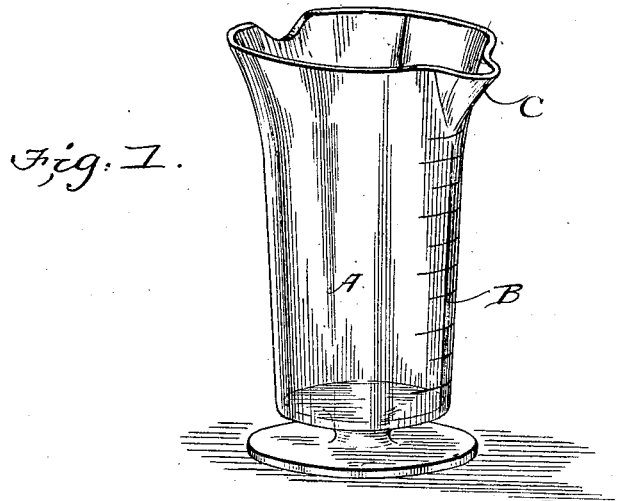
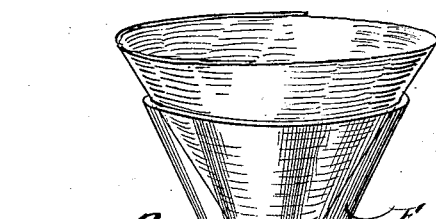
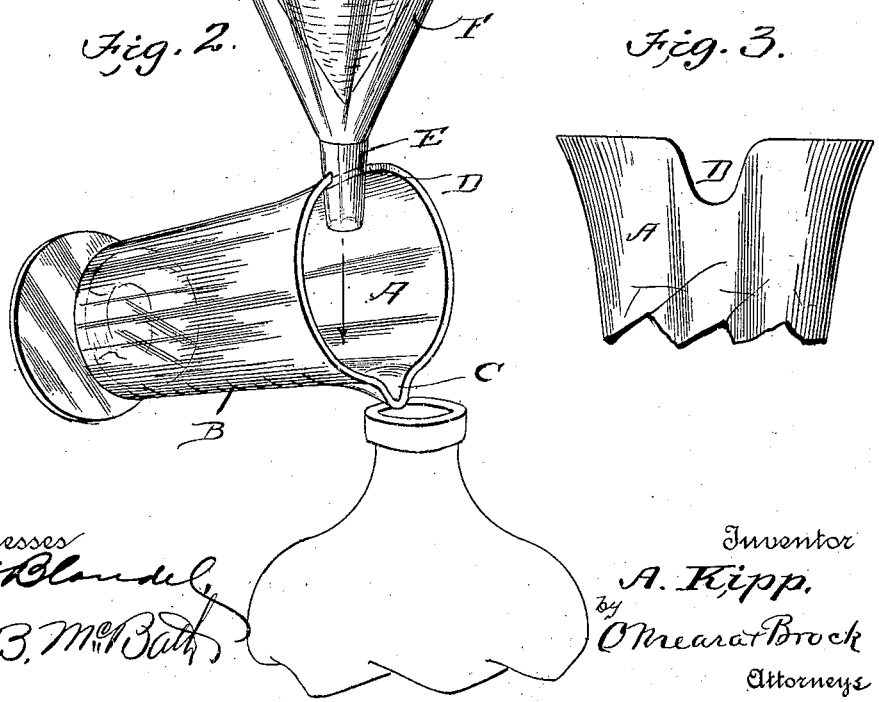

UNITED STATES PATENT OFFICE.

ARTHUR KIPP, OF MEMPHIS, TENNESSEE.

MEASURING-GLASS.

No. 925,582. Specification of Letters Patent. Patented June 22, 1909.

Application filed June 8, 1906. Serial No. 320,854.

*To all whom it may concern:*

Be it known that I, ARTHUR KIPP, a citizen of the United States, residing at Memphis, in the county of Shelby and State of Tennessee, have invented a new and useful Improvement in Measuring-Glasses, of which the following is a specification.

This invention relates generally to measuring or graduate glasses, the object of the invention being to provide a measure or graduate glass of such construction that it can be conveniently used in connection with a funnel and is especially adapted for use in connection with a funnel during the filtering operation, the object of the invention being to so construct the graduate glass, that every drop of the liquid can be emptied therefrom, without the necessity of placing the filter into a second graduate glass and a still further object is to so construct the graduate glass that the filtering funnel can be held in an open position during the operation and with these various objects in view, my invention consists essentially in making the graduate glass with a notch or cut out portion, directly opposite the lip of said glass, said notch or cut out portion being of such size and shape as to conveniently receive the neck or spout of the funnel.

In the drawings forming a part of this specification:—Figure 1 is a perspective view of a graduate glass constructed in accordance with my invention. Fig. 2 is a detail perspective view illustrating the practical application of the invention. Fig. 3 is an enlarged view showing one side of the glass.

Referring to the drawings A indicates a graduate glass which may be formed with an integral glass base, or it may have a detachable hard rubber base as these features do not enter into the spirit of my invention.

The graduate glass A is provided with the usual graduations, B and lip C and at a point preferably directly opposite the lip C there is a notch or recess D, said notch or recess being of such size and shape as to conveniently receive the neck or spout E of the funnel F.

In operation the neck or spout of the funnel is placed in the notch or recess produced in the edge of the graduate glass and consequently the funnel can be held in an upright position during the filtering operation and the filtrate can be quickly and easily conducted to the bottle or other receptacle by means of the glass, and it will be noted that every drop of the liquid can be poured from the glass and the filtering funnel always held in upright position.

In filling jobbing orders and in a great deal of prescription work a bottle of the desired size is filled from a graduate, in which case the exact measurement of the liquid is of no special consequence, the capacity of the bottle being known. It happens very often that all of the ingredients for a prescription, with the exception of one, which is usually the vehicle for the other ingredients and which in many cases requires to be filtered, are already prepared. In ordinary use it is necessary to filter this one ingredient, and in such cases the filtering is done in a second graduate, and the amount required is then poured into the bottle, the amount actually filtered being more than the actual amount required, and a certain amount of it is lost. With the use of my measuring glass the ingredients which did not require to be filtered or which were already prepared would be measured out in the usual way in my measuring glass, and the device placed in the position shown in Fig. 2 and the ingredient to be filtered poured into the filter placed in the funnel F and is filtered as the entire amount is poured into the bottle, no more being filtered than is necessary to fill the bottle in combination with the ingredients already measured out. It will therefore be obvious that the pouring of the measured ingredients, and the filtering and pouring into the bottle of the ingredients to be filtered takes place at the same time. It has been found in actual work that a glass constructed in this manner will save more or less time in filling orders for the jobbing trade, which orders are usually put up in bulk, and must frequently be filled with the loss of as little time as possible.

Having thus fully described my invention, what I claim as new and desire to secure by Letters Patent, is:—

A measuring glass provided with a lip at one side at its upper edge, and a notch in the opposite side directly in transverse alinement with the lip, said notch having inclined side edges and adapted to receive the neck of a funnel whereby the liquid from the funnel will drop into the lip and pass out of the same into a receptacle.

ARTHUR KIPP.

Witnesses:
J. THOS. WELLFORD,
W. R. FERGUSON.